W. H. PATE.
HAY PRESS.
APPLICATION FILED NOV. 6, 1915.
1,234,078.
Patented July 17, 1917.
2 SHEETS—SHEET 1.
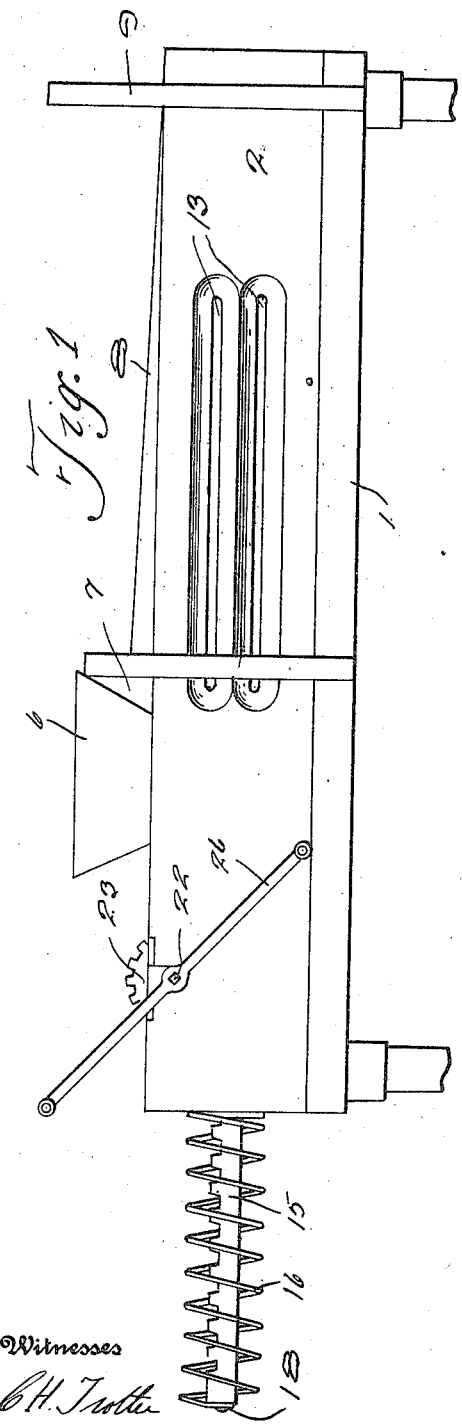
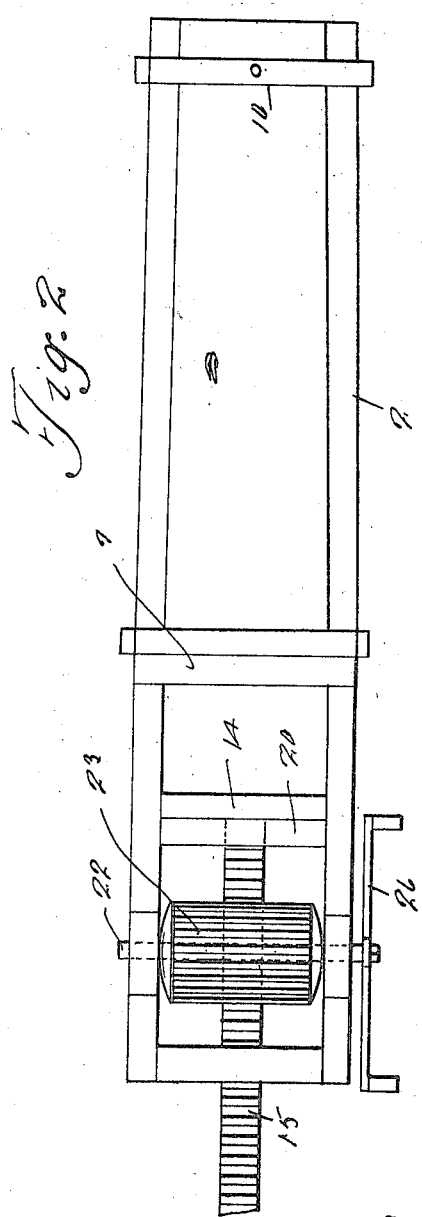
Witnesses
C. H. Trotter
H. K. Martin
Inventor
W. H. Pate
By [signature], Attorney

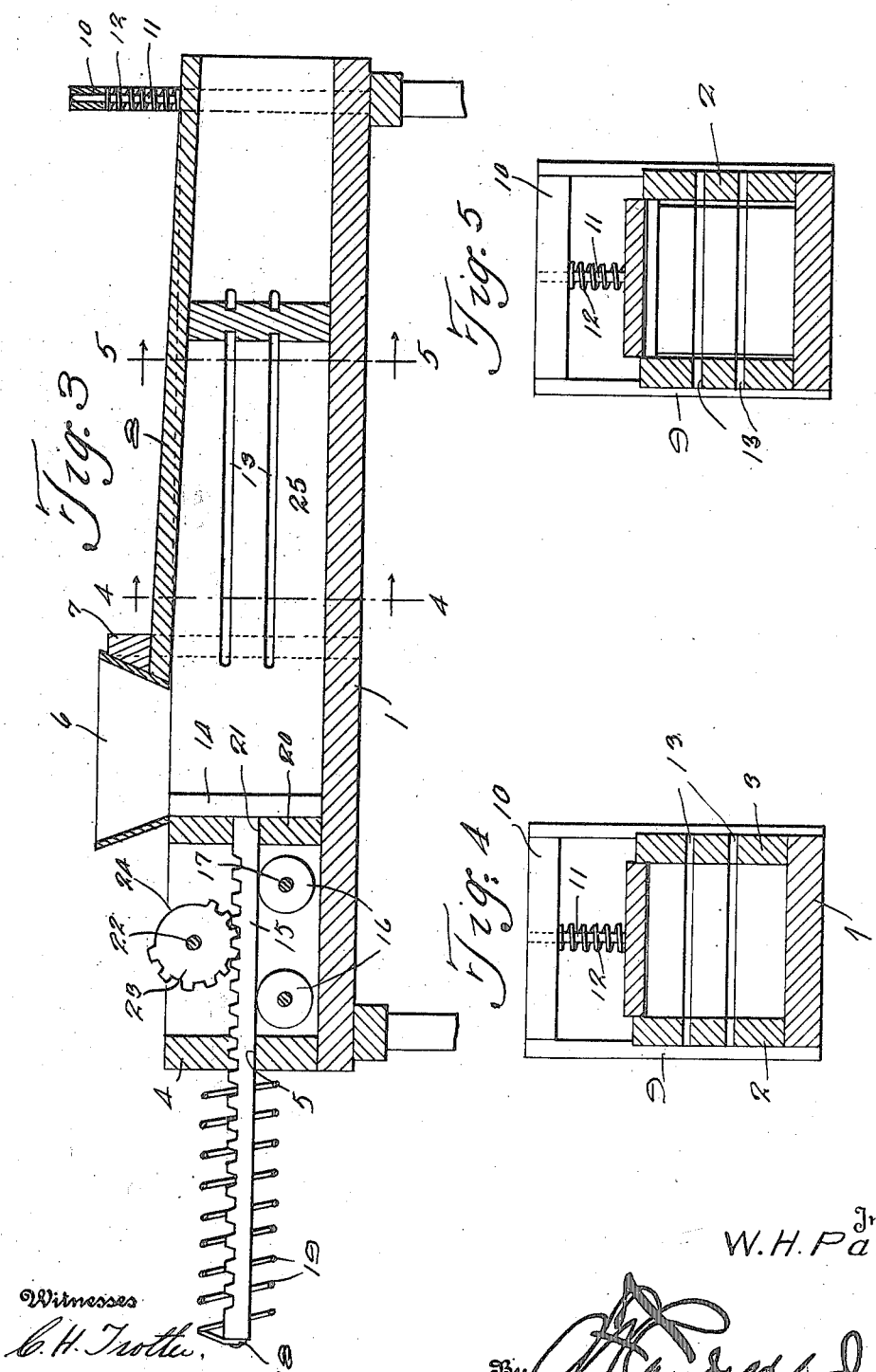

UNITED STATES PATENT OFFICE.

WILLIAM H. PATE, OF JEFFERSON, TEXAS, ASSIGNOR OF ONE-HALF TO ARTHUR M. RHYNE, OF AVINGER, TEXAS.

HAY-PRESS.

1,234,078.

Specification of Letters Patent.

Patented July 17, 1917.

Application filed November 6, 1915. Serial No. 60,028.

*To all whom it may concern:*

Be it known that I, WILLIAM H. PATE, a citizen of the United States, residing at Jefferson, in the county of Marion and State of Texas, have invented certain new and useful Improvements in Hay-Presses; and I do hereby declare the following to be a full, clear, and exact description of the invention, such as will enable others skilled in the art to which it appertains to make and use the same.

This invention relates to new and useful improvements in hay presses and the principal object of the invention is to provide a hay press which may be easily and cheaply constructed and which will effectively press the hay into bales, in order to facilitate its handling.

Another object of the invention is to provide a hay press wherein the plunger is manually moved to compress the hay within the device and which after moving a predetermined distance will automatically return to its original position ready for a second operation.

A still further object of the invention is to provide a hay press which tapers toward its open end so as to firmly compress the material the farther it enters the press.

A still further object of the invention is to provide a hay press tapering toward the mouth so that the header block will be automatically retained in position for operation.

With these and other objects in view, the invention consists in the novel combination and arrangement of parts which will be fully set forth in the following specification and accompanying drawings, in which:—

Figure 1 is a side view in elevation of a press constructed in accordance with this invention.

Fig. 2 is a top plan view of Fig. 1.

Fig. 3 is a longitudinal sectional view through the hay press.

Fig. 4 is a transverse sectional view on the line 4—4 of Fig. 3, and

Fig. 5 is a transverse sectional view on line 5—5 of Fig. 3.

Referring to the drawings, the numeral 1 designates the bottom of the hay press having the side walls 2 and 3 secured thereto. These side walls extend upwardly from the bottom 1 and taper toward the mouth of the device. The rear wall 4 is secured at the wider end of the bottom and is provided with a central opening 5. The upper edges of the side walls 2 and 3 support the hopper 6 near the end wall 4 and extending from a transverse bar 7 is the top 8. This top 8 extends from the forward edge of the hopper 6 to the mouth of the press and is of a width equal to the distance between the side walls 2 and 3.

Extending upwardly from the side walls 2 and 3 at the mouth of the device are the uprights 9 supporting the cross members 10 which in turn support the downwardly extending pin 11 which is surrounded by the spring 12. This pin 11 moves freely through an opening in the cross bar 10 and is secured to the free end of the top 8 so as to allow said top to move upwardly or downwardly during the operation of the press.

The side walls of the press are formed with the longitudinal slots 13 which extend from a point substantially one-fourth of the length of the sides from the mouth of the press to a point slightly in front of the hopper 6. These slots are for the reception of the bale binding wires to enable the user to readily slip the same in place between the header blocks.

The plunger used for compressing the hay, is designated by the numeral 14 and carries the plunger rod 15 consisting of a rack bar mounted to slide on the rollers 16 which are rotatably mounted on suitable axles 17 extending transversely of the press in the rear of the hopper 6. Surrounding the plunger rod and secured to the rear end thereof as at 18 is the compression coil spring 19, the forward end of which abuts the rear wall 4 of the press so that the plunger will normally be urged rearwardly into the position shown in Fig. 3. A partition wall 20 extends between the side wall and up from the bottom wall 1 at the rear end of the hopper 6 and is provided with a central opening 21 through which the plunger rod 15 is slidable. In order to move the plunger into compressing position, a suitable axle 22 extends transversely between the walls 2 and 3 in the chamber between the rear wall 4 and the partition wall 20 and carries a toothed cylinder 23 provided with the blank portion on its periphery 24. The blank portion 24 is arranged to allow the plunger to be returned to its normal non-compressing position under the influence of the spring 19 in a manner fully set forth in the following paragraph.

It will be apparent from the foregoing that in use the hay is fed through the hopper 6 into the press and the space between the header block plunger as designated by the numeral 25 is entirely filled with hay. The user then passes the binding wires through the slots and arranges them to seat in the grooves in the header blocks whereupon the plunger is moved forwardly by the rotation of the axle 22 and the hand crank 26 secured to one end thereof and it will be seen that the rotation of the axle will cause the gear to move the plunger forwardly and compress the hay within the baler. As the teeth on the barrel disengages the rack bar, the blank portion 24 will permit the plunger to return to its normal position under the influence of the spring 6. The binding wires are then secured in place and the device is then ready for a second operation. The header blocks will be held in vertical position by their frictional engagement with the tapered walls of the baler and the bales will be expelled through the mouth of the device under considerable pressure due to the inclination of the walls.

What is claimed is:—

A hay press comprising a bottom tapering toward one end, side walls secured to the body, an end wall secured to the bottom and side walls, a hopper secured to the side walls adjacent the end wall, vertical uprights secured to the side walls adjacent the hopper and tapering end of the bottom, transverse members connecting said uprights, a cover carried by one of said transverse members, means for movably connecting the free end of the cover to the other transverse member, a coil spring interposed between the cover and the last mentioned transverse member to normally urge the cover downwardly, said side walls having elongated slots, a head slidable within the walls, a rack bar slidable through the end wall, rollers journaled within the side walls for supporting the rack bar, a plunger secured to the rack bar, a transverse partition secured to the side walls for limiting the rearward movement of the rack bar, a coil spring secured to the end of the rack bar and bearing against the end wall for normally holding the plunger in engagement with the transverse partition, a barrel journaled within the side walls and having teeth formed on a portion of the periphery thereof providing a portion of the periphery blank, means for rotating the drum to cause the teeth to move the plunger in the direction of the head to compress hay against the head, and said plunger being permitted to return to its normal position under the influence of the spring when the blank periphery of the barrel moves adjacent the rack bar.

In testimony whereof I affix my signature in presence of two witnesses.

WILLIAM H. PATE.

Witnesses:
J. J. EARLY,
FRED HALL.